(12) United States Patent
Romanek et al.

(10) Patent No.: US 6,732,759 B2
(45) Date of Patent: May 11, 2004

(54) VENTING DEVICE INTENDED FOR A MOTOR VEHICLE TANK

(75) Inventors: Christian Romanek, Noailles (FR); Sophie Magdeleine, Andresy (FR); Jean-Philippe Bar, La Neuville sur Auneuil (FR); Jean-François Blum, Gisors (FR)

(73) Assignee: I.T.W. de France, Beauchamp (FR)

( * ) Notice: Subject to any disclaimer, the term of this patent is extended or adjusted under 35 U.S.C. 154(b) by 127 days.

(21) Appl. No.: 10/038,768

(22) Filed: Jan. 8, 2002

(65) Prior Publication Data

US 2002/0112763 A1 Aug. 22, 2002

(30) Foreign Application Priority Data

Jan. 8, 2001 (FR) .............................. 01 00163

(51) Int. Cl.⁷ .............................. F16K 24/00
(52) U.S. Cl. .................. 137/588; 137/587; 141/59; 220/86.2; 220/746
(58) Field of Search .................. 137/588, 589, 137/587; 141/59; 220/86.2, 746, 749

(56) References Cited

U.S. PATENT DOCUMENTS

| | | | |
|---|---|---|---|
| 4,715,509 A | * | 12/1987 | Ito et al. .................. 141/59 |
| 4,809,865 A | | 3/1989 | Mori et al. |
| 5,215,132 A | * | 6/1993 | Kobayashi .................. 137/587 |
| 5,819,796 A | | 10/1998 | Kunimitsu et al. |
| 5,848,626 A | | 12/1998 | Kim |
| 6,105,612 A | | 8/2000 | Scaar |

FOREIGN PATENT DOCUMENTS

| DE | 197 14 813 | 7/1998 |
|---|---|---|
| FR | 2 581 597 | 11/1986 |
| FR | 2 699 463 | 6/1994 |

OTHER PUBLICATIONS

Sche Verlagshabdlung "Neues Einfuellstutzenkonzept" Atz Automobiltechnische Zeitschrift, vol. 100, No. 12, Dec. 12, 1998, pp. 880–881, XP000824332.

* cited by examiner

Primary Examiner—Kevin Lee
(74) Attorney, Agent, or Firm—Lowe Hauptman Gilman & Berner LLP

(57) ABSTRACT

This device is intended for a motor vehicle tank (2) having on the one hand a filler pipe (4) provided with a flap (12) mounted so as to pivot about a spindle (34), prestressed in the closed position and intended to be opened by the end of a filling nozzle (10), and on the other hand a pipe (16, 18) for venting the tank. A device (20) is provided for closing off the vent pipe (16, 18) of the tank whilst it is being filled, being controlled from the pivoting of the flap (12) about its spindle (34).

21 Claims, 6 Drawing Sheets

VENTING DEVICE INTENDED FOR A MOTOR VEHICLE TANK

FIELD OF THE INVENTION

The present invention concerns a device for venting a motor vehicle fuel tank.

BACKGROUND ART

For limiting air pollution, motor vehicle fuel tanks must eject as little fuel vapour as possible to the atmosphere. In order to be able to fill and then empty a fuel tank it is necessary to provide a venting device. Thus, during the filling phase, the air contained in the reservoir can escape, and during the emptying of the tank the air can re-enter it in order to replace the fuel consumed. The venting device also prevents overpressure or negative pressure in the reservoir when variations in temperature occur.

To limit the ejection of fuel vapour to the atmosphere, it is known that the venting device can be equipped with a canister which recovers the fuel escaping in the form of vapour during the vehicle running and parking phases. Thus the gas escaping from the tank is "filtered" in order to recover the fuel and eject only air.

To prevent the ejection of fuel vapour into the atmosphere when the tank is filled, it is known that a nozzle with fuel vapour exhaust can be used. Such a nozzle is complex and its cost is high. Because of this such nozzles are uncommon or not in widespread use.

SUMMARY OF THE INVENTION

The technical problem at the basis of the present invention is to economically achieve a limitation to the ejection of fuel vapour into the atmosphere both during a tank filling phase and during running and parking phases.

The invention applies notably to vehicles consuming unleaded petrol. In this case, the tank filler pipe is provided at its entrance with a flap mounted so as to pivot. This prevents the introduction of fuel other than unleaded petrol.

The device proposed by the invention is a venting device intended for a motor vehicle tank having on the one hand a filler pipe provided with a flap mounted so as to pivot about a spindle, prestressed in the closed position and intended to be opened by the end of a filling nozzle, and on the other hand a pipe for venting the tank.

According to the invention, means are provided for closing off the vent pipe of the tank when it is being filled, being controlled by the pivoting of the flap about its spindle.

Making provision for acting on the venting device when the flap closing off the filling orifice is actuated makes it possible to treat solely the tank filling phase separately. The limitation of the ejection of fuel vapours into the atmosphere during refuelling is then dealt with directly by the venting system as described below with a few example embodiments or by means of a nozzle with fuel vapour exhaust.

In a preferential embodiment, the pivoting of the flap about its spindle mechanically drives a valve for effecting the opening and closing of the vent pipe.

Given that the rotation of the flap in the filling pipe does not exhibit a constant angular movement, provision is for example made for the valve to be a rotor valve and for the rotor of the valve and the spindle of the valve to be connected by elastic means, such as for example a spring. A movement less than the minimum movement of the flap to allow the passage of the end of a filling nozzle will be chosen for the rotor to ensure the complete movement of the rotor.

To limit the ejection of fuel vapours into the atmosphere, the vent pipe is advantageously connected to a fuel vapour filtration device. Thus the gases leaving the tank are filtered so as to recover the fuel, sending it for example to a fuel inlet device, and to eject into the atmosphere only relatively pure air.

A variant embodiment according to the invention provides for the vent pipe to connect the tank to a valve actuated by the flap, for the valve also to be connected to a fuel vapour filtration device and for a pipe to connect the tank to the filling pipe, close to the filling orifice.

In a preferential embodiment, the tank has two vent pipes each connected on the one hand to the tank and on the other hand to a valve controlled by the spindle of the flap situated in the filler pipe; the valve, in a first position corresponding to the closed position of the flap, connects a first vent pipe to a fuel vapour filtration device, the second vent pipe then being closed off by the valve, and the valve, in a second position corresponding to the open position of the flap, connects the second vent pipe to the fuel vapour filtration device, the first vent pipe then being closed off by the valve.

In this embodiment, the first pipe providing the venting is advantageously connected to the filler pipe when the flap is closed, by means of a non-return valve preventing any passage from the filler pipe to the vent pipes.

For this preferential embodiment, provision can be made for the valve to have a two-position rotor, two radial inlets disposed in the same plane with an angular offset corresponding to the magnitude of the rotation of the rotor and an outlet, and for the rotor, in each of its two positions, to block off an inlet, the other then being in communication with the outlet.

According to a first variant of this device, the rotor can have a longitudinal arm off-centre with respect to the rotation axis of the rotor and carrying a membrane substantially radial with respect to the movement of the rotor, blocking off an inlet in each of the two positions.

According to another variant embodiment, the rotor is in the form of a shaft with a cam which in a first position closes off one inlet and in the second position closes off a second inlet.

To limit the force to be exerted on the flap in order to open it and to be able to fill the tank, the flap has for example a hollow on its face intended to come into contact with a filling nozzle so that the contact between the nozzle and the flap takes place at a point distant from the pivot axis of the flap.

The present invention also concerns a tank, characterised in that it is equipped with a device as described above.

The invention, in broader terms, also concerns a tank having a filler pipe in which there is a flap prestressed in the closed position, characterised in that it has means for controlling a device for limiting the emission of polluting substances and/or a safety device, from the pivoting of the flap.

BRIEF DESCRIPTION OF THE DRAWINGS

The characteristics and advantages of the invention will emerge more clearly from the following description, given with reference to the accompanying schematic drawing, in which.

DETAILED DESCRIPTION OF THE INVENTION

Figure 1:
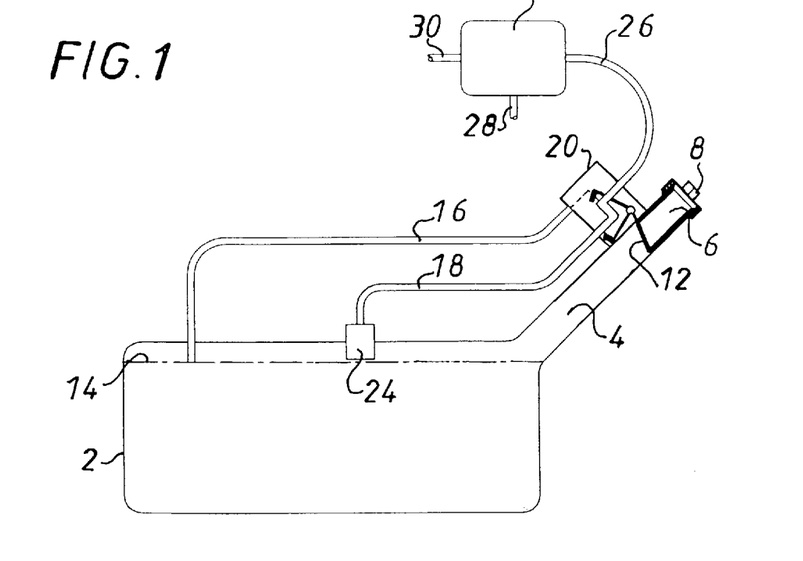
FIG. 1 is a schematic view of a tank equipped with a device according to the invention in the running or parking phase, FIG. 2 corresponds to FIG. 1 in the refuelling phase.
Figure 2:
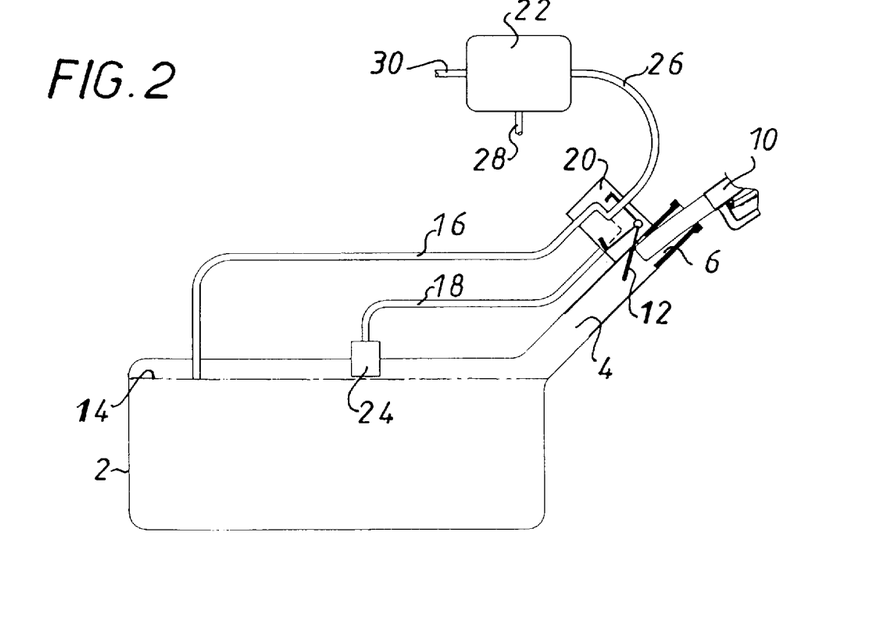

FIGS. 1 and 2 depict a motor vehicle fuel tank 2 having in its top part a filler pipe 4. This pipe 4 is closed in FIG. 1 at its free end which constitutes a filling orifice 6. A cap 8 closes off this orifice sealingly. FIG. 2 shows the tank 2 in the refuelling phase and the end of a nozzle 10 introduced into the orifice 6. It can be seen in this FIG. 1 that the orifice 6 is closed off by a valve 12 which is opened by the nozzle 10 during fuelling (FIG. 2).

The filling level 14 is represented by a dot and dash line in FIGS. 1 and 2. A filling and ventilation device including two vent pipes 16 and 18, a valve 20 and a canister 22 is provided.

Each vent pipe 16, 18 has an end disposed at the filling level 14 in the top internal part of the tank 2. The other end of these pipes 16, 18 is on each occasion connected to the valve 20.

The first vent pipe 16 is intended to effect the venting (the discharge of the gases contained in the tank) in the refuelling phase whilst the second vent pipe 18 is intended to effect this venting in the running and parking phases. This second pipe is then equipped at its end on the same side as the tank 2 with a valve 24, also referred to as an ROV (Roll Over Valve), which prevents the liquid fuel passing into the vent pipe 18 and therefore also into the canister 22.

A pipe 26 connects the valve 20 to the canister 22. In FIG. 1, in the running phase, the valve 20 provides the connection between the second vent pipe 18 and the pipe 26, the end of the first vent pipe 16 being situated on the same side as the valve 20, then being closed. In FIG. 2, in the refuelling phase, the first vent pipe 16 is in connection with the pipe 26 whilst the second vent pipe 18 is closed by the valve 20. As depicted schematically in FIGS. 1 and 2, the valve 20 is controlled by the rotation of the flap 12.

The canister 22 is a filtration device for condensing the fuel vapours. Thus the gaseous mixture conveyed into the canister 22 by the pipe 26 is filtered. A first outlet 28 of the canister conducts condensed fuel to a fuel inlet device and a second outlet 30 ejects relatively pure air.

FIGS. 3 to 6D depict a first embodiment of a valve 20 fulfilling the functions described above.

Figure 3:
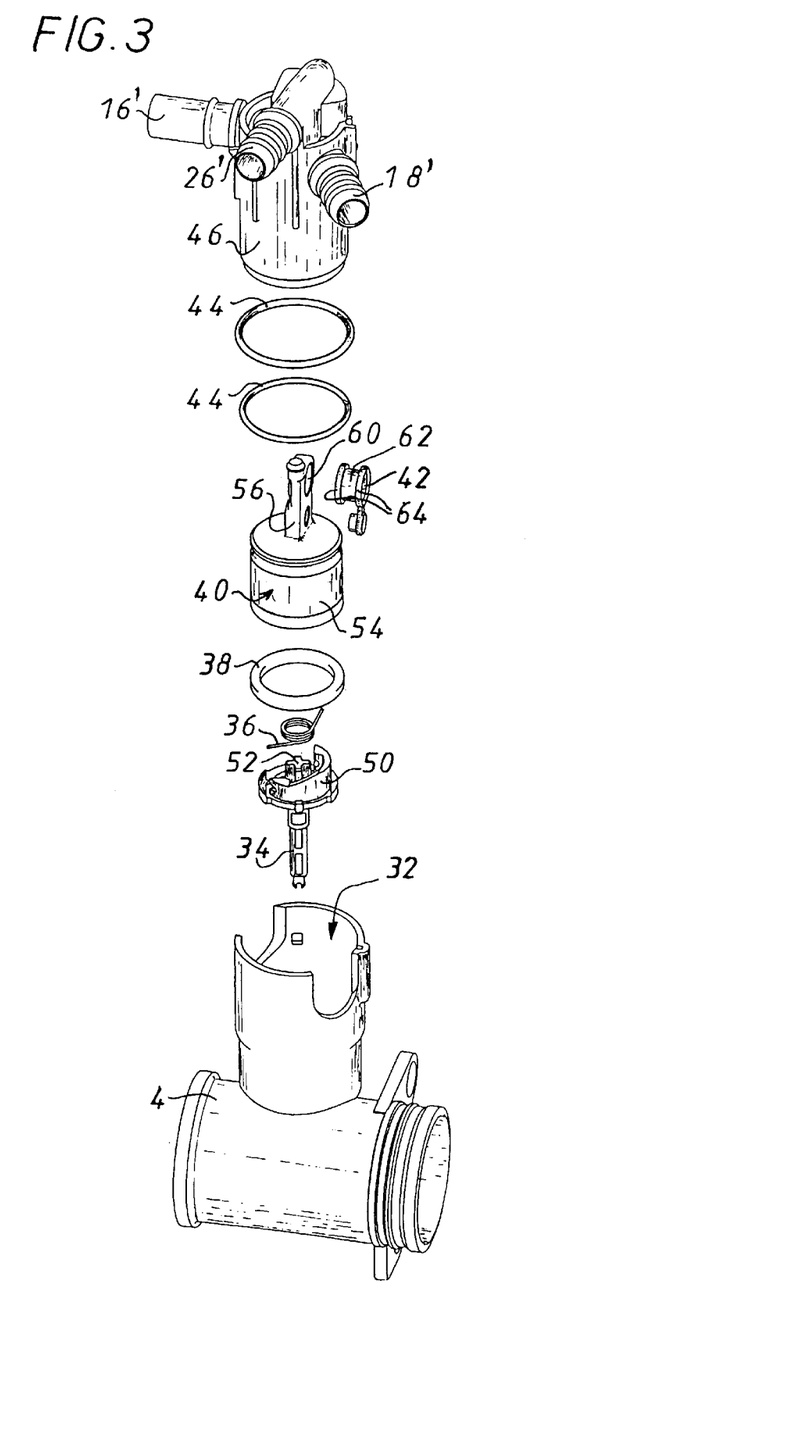
FIG. 3 is an exploded perspective view of a device according to the invention.
Figure 4:
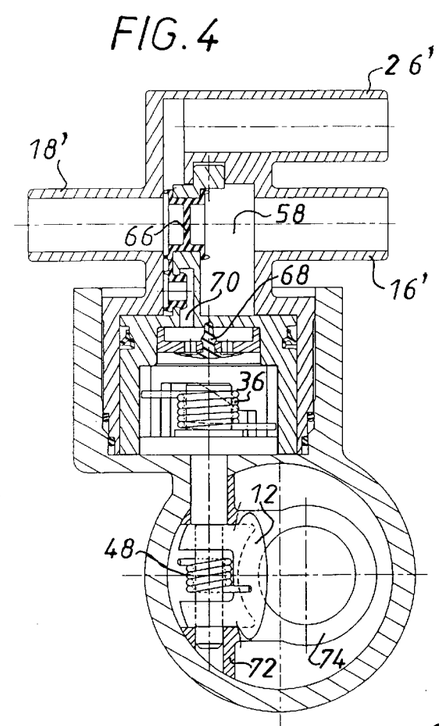
FIG. 4 is a view in section of the device of FIG. 3 in a first position, FIG. 5 corresponds to FIG. 4 in a second position.
Figure 5:
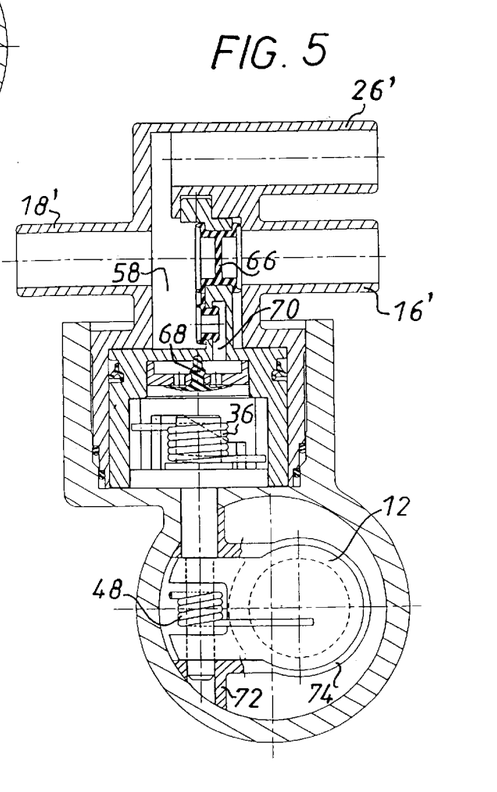

FIG. 3 depicts part of the filler pipe 4 placed at the orifice 6 and containing the flap 12. With this part of the filler pipe 4 there is associated, in a single piece, a radial tubular part defining a cavity 32. This FIG. 3 shows a spindle 34, a spring 36, a joint 38, a rotor 40, a membrane 42, two joints 44 and an enclosure 46. FIGS. 4 and 5 show these various components in the assembled position.

The spindle 34 is situated inside the filler pipe 4 and supports the flap 12. A return spring 48 is provided to prestress the flap 12 in its closed position depicted in FIGS. 1 and 5. On the cavity 32 side, the spindle 34 carries a flange 50. The spring 36 is intended to be mounted on this flange 50. It is in the form of a helical spring with, at each of its ends, a tangential arm. Stops are provided on the flange 50 and are intended to receive in abutment the arms of the spring 36. Means 52 are provided at the flange 50 for centring the spring 36.

The rotor 40 is on the one hand in the form of a cylindrical sleeve 54 and on the other hand in the form of an off-centre longitudinal arm 56. The cylindrical sleeve 54 covers the flange 50 and the spring 36. Inside the cylindrical sleeve 54 there are also provided stops on which the arms of the spring 36 can come to bear. The stops on the flange 50 and inside the cylindrical sleeve 54 are disposed so that a rotation of the spindle 34 causes a rotation of the rotor 40 whilst, by virtue of the spring 36, allowing a magnitude of rotation movement greater on the side of the spindle 34 than the rotor 40.

The arm 56 of the rotor 40 is parallel to the spindle 34 of the flap 12, but offset with respect to this spindle 34, which corresponds to the axis of rotation of the rotor 40. This arm carries the membrane 42. The latter is intended to close off, according to the position of the rotor 40, either the end of the vent pipe 16 or the end of the vent pipe 18.

The enclosure 46 is in the form of a cylindrical sleeve closed at one of its ends and having couplings 16', 18' and 26' intended to receive the ends of the pipes 16, 18 and 26 respectively connected to the valve 20. The couplings 16' and 18' are placed in the same transverse plane of the enclosure 46 and are offset angularly so that the membrane 42, in a first extreme position of the rotor 40, comes to close off the coupling 16' whilst in the other extreme position of the rotor 40 the coupling 18' is closed off. The coupling 26' is offset axially with respect to the couplings 16' and 18' and opens out into a chamber 58 which is in communication both with the coupling 16' and the coupling 18'.

The joint 38 is placed around the rotor 40, in a corresponding peripheral groove in order to provide a seal between the cylindrical sleeve 54 and the inside of the enclosure 46. This joint 38 is of the lip joint type and has a cross-section adapted to the shape of the rotor and of the enclosure. Its shape is designed to minimise the torque between the rotor 40 and the enclosure 46. The seal between the external face of the enclosure 46 and the inside of the sleeve defining the cavity 32 is produced by means of the two O-ring seals 44.

The system must function in a temperature range of between approximately −40° C. and +120° C. and the joints must be sealed and impermeable to fuel vapour. The two joints used consist of different materials. One of the two joints is based on fluorocarbon, an impermeable material, but one which does not sufficiently comply with the characteristics of sealing at negative temperatures. On the other hand, in negative temperatures, fuel vapour emissions are nonexistent. The second joint, based on nitrile, does not have any particular permeability characteristics but on the other hand preserves its flexibility and its elasticity at negative temperatures, and therefore ensures the imperviousness of the system.

The angle of rotation of the rotor 40 is for example 60°. The flap 12 for its part can for example pivot through 65° to 75°. As already indicated above, the spring 36 compensates for this difference in rotation magnitude.

The arm 56 has a radial bore 60. As can be seen in FIGS. 4 and 5, the membrane 42 is in the form of a sleeve 62 having at each of its ends a protrusion 64 projecting towards the outside of the sleeve, thus allowing a good fixing of the membrane 42 to the inside of the bore 60. Inside the sleeve 62 there is a partition 66 which sealingly closes off the inside of the sleeve 62. The arm 56 being eccentric, and the rotation of the rotor being only 60°, the closure of the coupling 16' is effected by means of a protrusion 64 and the closure of the coupling 18' with the other protrusion 64. Thus the angular separation between the two couplings 16' and 18' is 120° (180°–60°).

The valve 20 also effects, when the coupling 16' is closed, that is to say in the running phase, a communication between the vent pipe 18 and the filler pipe 4. The presence of a single-direction valve 68 disposed at the level of the rotor 40 can be seen in FIGS. 4 and 5. This single-direction valve 68 allows passage from the vent pipe 18 to the filler pipe 4 but prevents any passage in the other direction. The connection between these two pipes 18 and 4 is provided partly by a channel 70 produced in the axis 56 of the rotor 40, this channel opening out inside the cylindrical sleeve 54. The single-direction valve 68 closes the end of this channel on the side of the filler pipe 4. The other end of this channel 70 opens out in the enclosure 46. A bearing face, produced from the same material as and in a single piece with the membrane 42 equips this channel end. This bearing face is situated just alongside the protrusion 64 on the membrane 42 intended to close off the coupling 18'. Thus, when the coupling 18' is closed off, the inlet to the channel 70 is also closed off. No communication is therefore possible with the filler pipe 4. On the other hand, when the membrane 42 closes off the coupling 16', the coupling 18' is open and the corresponding protrusion 64 is not in abutment. The inlet to the channel 70 is then open, thus allowing passage from the coupling 18' to the filler pipe 4. In addition, the spindle 34 has an axial bore, not shown, making it possible to communicate with the filler pipe 4.

The functioning of this device is then as follows.

As indicated above, in the running or parking phase, the cap 8 sealingly closes off the orifice 6 of the filler pipe 4 and the flap 12 closes off this pipe. The valve 20 provides the closure of the first vent pipe 16 and the connection between the second vent pipe 18 and the pipe 26 leading to the canister 22. In addition, the valve allows passage from the second vent pipe 18 to the filler pipe 4 passing through the single-direction valve 68.

During refuelling, the cap 8 is removed and a nozzle 10 is introduced into the orifice 6. The front end of the nozzle then pushes the flap 12, which pivots with its spindle 34. As indicated above, the flap 12 is fixed with respect to rotation to the spindle 34. The latter is mounted in a known manner on cheeks 72 issuing for example from a device 74 for guiding the nozzle 10. The diversity of fuel nozzles determines a range of rotation of the flap 12 and its spindle 34 which is generally between 65° and 75°. This is because the fuel nozzles which are normally encountered have shapes, diameters, curvatures and extents to which they penetrate into the filling orifice which differ from one model to another. The angular movement of the rotor 40 is for its part fixed at 60° for example. Here a value less than the minimum value of rotation of the flap 12 is chosen. The spring 36 makes it possible to compensate for this difference in angular movement. The arms of the spring 36 are prestressed on the stops on the flange 50 of the spindle 34. The prestressing torque is greater than the rotation torque of the rotor 40 in the enclosure 46. By way of example, it is possible for example to have a torque between the rotor 40 and the envelope 46 of around 0.1 Nm and a prestressing torque of the spring 36 of around for example 0.15 Nm. The ends of the arms of the spring 36 are then opposite two stops produced at this cylindrical sleeve 54 of the rotor 40. The angular movement of the rotor 40 is limited by the abutment of the protrusions 64 of the membrane 42 on the interior ends of the couplings 16' and 18'.

Figure 6A:
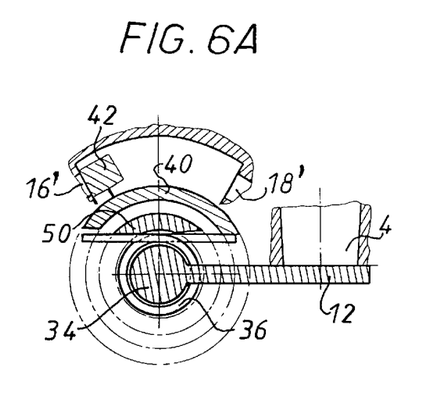
FIGS. 6A to 6D are schematic views explaining the functioning of the device of FIGS. 3 to 5 in four different positions.

FIGS. 6A to 6D illustrate the compensation system between the flap 12 and the rotor 40. FIG. 6A illustrates the closed position of the flap 12. The arms of the spring 36 are in one case in abutment on a stop on the flange 50 and in the other case on a stop on the rotor 40. By slightly pivoting the flap, the arms of the spring 36 then come into abutment both on the stops on the flange 50 and on those on the rotor 40. Between the positions depicted in FIGS. 6A and 6B, the flap 12 has pivoted through a few degrees whilst the rotor 40 has not yet moved.

Figure 6B:
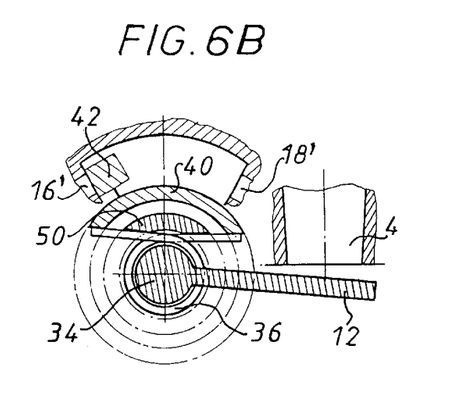
Figure 6C:
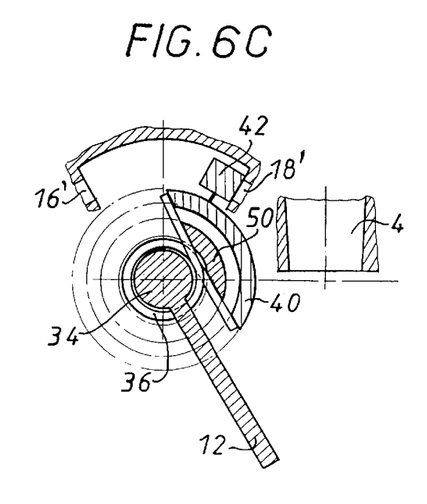
Figure 6D:
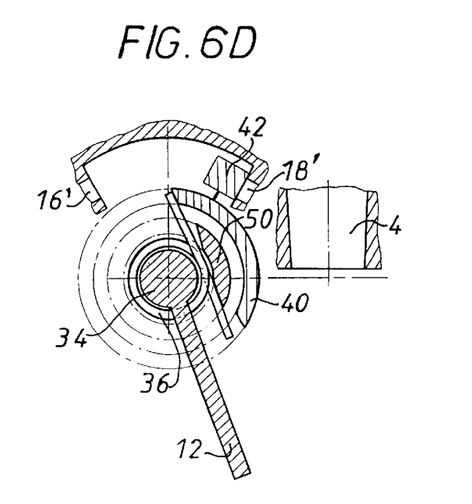

In FIG. 6C, the rotor 40 and the flap 12 have each pivoted through 60° with respect to the position depicted in FIG. 6B. The membrane 42, shown diagrammatically in FIGS. 6A to 6D by means of a hatched rectangle, then closes off the end of the coupling 18'. The rotor 40 is then at the end of travel but the flap can still pivot. The extreme open position of the flap 12 is illustrated in FIG. 6D. It can be seen that then one arm of the spring 36 is in abutment on a stop on the flask 50 of the spindle 34 connected to the flap 12 whilst the other arm is in abutment only on a stop connected to the rotor 40.

The position of FIG. 6D corresponds to that of FIGS. 2 and 4. The valve 20 closes off the end of the pipe 18 and the vent pipe 16 communicates with the pipe 26 leading to the canister 22. As explained above, in this position the channel 70 is closed and no communication is effected between either one of the vent pipes 16 or 18 and the filler pipe 4.

The filler pipe 4 preferably has a reduced cross-section. Its internal diameter is for example around 20 mm. Thus, during refuelling, the volume of fuel introduced into the tank occupies the entire internal cross-section of the filler pipe 4 and prevents gases backing up from the tank 2 through this pipe. This principle is known to experts and is sometimes referred to by the term "fuel plug".

It is seen that, in this position of the valve 20, when the flap 12 is open, the function preventing the overfilling of the tank is fulfilled. This is because the communication between the vent pipe 18 and the pipe 26 being closed, this function preventing overfilling of the tank is fulfilled.

The fuel vapour contained in the reservoir, during the phase of filling it, is discharged through the vent pipe 16, by means of a valve 20, which, in this phase, puts this vent pipe 16 and the pipe 26 leading to the canister 22 in communication. The latter then treats the fuel vapours escaping from the tank 2.

In addition, as already indicated above, the valve 20 provides a perfect isolation of the filler pipe 4 vis-à-vis the other pipes and canister. When fuelling has ended, the nozzle 10 is removed from the orifice 6 and the entire venting device returns to the position depicted in FIGS. 1 and 5.

In this position, the valve 20 closes off communication between the vent pipe 16 and the pipe 26. Thus sending fuel to the canister 22 is prevented. This is because, when liquid fuel enters such a canister, the latter degrades.

In the running phase, the venting of the tank is effected by the second vent pipe 18 by means of the valve 20 and the conduit 26, via the canister 22. The ROV valve 24 then prevents passage of liquid fuel to the canister.

In this running phase, the vent pipe 18 is in communication with the filler pipe 4 by means of the single-direction valve 68 and the channel 70, which is then open. The pipe 18 is closed off by the valve 20. There is therefore no discharge of gas through this conduit. The conduit 16, communicating with the outside, effects the venting until the level of fuel in the tank 2 is in the configuration in FIG. 2. At this state of refuelling, the pipe 16 is closed off by the fuel, and the gases can no longer be discharged and cause triggering of the nozzle 10, and therefore the end of filling. This state makes it possible to keep a gaseous volume in the reservoir 2 between the level of fuel and the internal top wall of the tank, as shown diagrammatically in FIG. 2. Communication between the vent pipe 18, the pipe 26 and the filler pipe 4, in the running phase, is effected with a very much reduced pressure drop. An umbrella-shaped valve such as the one depicted in FIGS. 4 and 5 can make it possible to have a pressure drop of less than 10 mbar. Thus, when the imperviousness of the complete fuel circuit is being diagnosed, it is possible to balance the pressures between the filler pipe 4 and the rest of the system, notably in the case where the filler pipe 4 has a siphon at its base with fuel present.

The device described above makes it possible to fulfil the sealing functions between the vent pipes 16 and the pipe 26 using simple means having recourse notably to abutments between flat faces, in addition the abutment faces of the membrane 42 (the protrusions 64) making it possible to absorb any defects in shape and surface state without interfering with the performance of the device.

This device has only one dynamic joint which exhibits a force which does not generate a significant amount of torque. This contributes notably to excellent reliability of the device, which must provide a minimum of fifteen years operation.

The simplicity of this device is also due to the direct in-line control between the spindle of the flap 12 and the valve 20. This makes it possible, with reduced bulk, to have large cross-sections of flow and reduced pressure losses.

The compensation for the magnitude of the movements is achieved by means of a simple spring which contributes to both the simplicity of the device and its reliability. The enclosure 46 of the valve 20 is produced in a single piece and can easily be produced from impermeable materials without any surface treatment.

The device as described above can be adapted to two-way or three-way valves.

Figure 7:
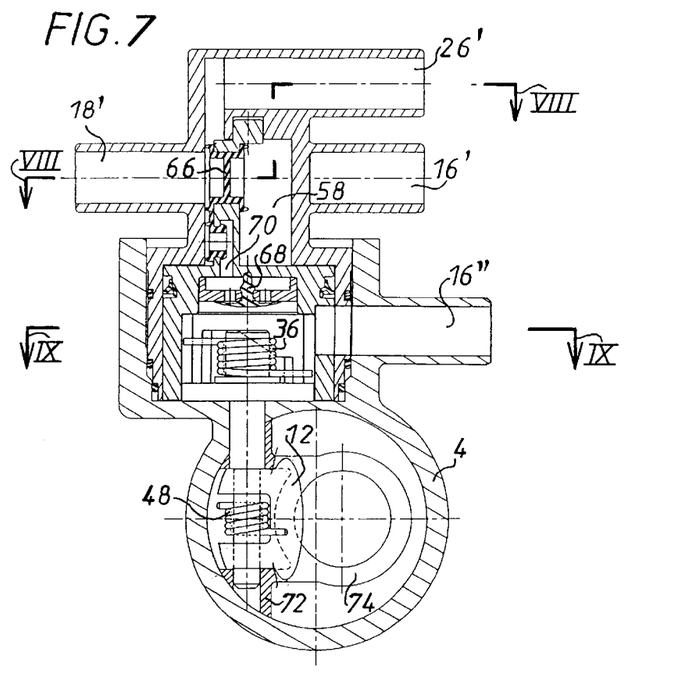
FIG. 7 is a view in section corresponding to FIG. 4 for a variant embodiment on the device depicted in FIGS. 3 to 5.

FIG. 7 illustrates a variant embodiment of the device depicted in FIGS. 3 to 6 in which the valve 20 functions as a single-way valve.

In this embodiment, the coupling 16' does not open out. It is replaced by a coupling 16" connected to the vent pipe 16. The pipe 16" is in permanent communication with the filler pipe 4 whatever the position of the flap 12. The communication is for example here also provided by an axial bore, not shown, in the spindle 34 of the flap 12.

The fuel vapours contained in the tank are discharged during refuelling by the pipe 16 and the coupling 16" to the filler pipe 4. They are then discharged to atmosphere, or recovered by the fuel nozzle 10, which may be a fuel vapour exhaust nozzle.

In this embodiment, when refuelling, the vent pipe 18 is closed off, thus fulfilling the function of preventing the overfilling of the tank. In the running phase, that is to say when the flap 12 is closed, the vent pipe 18 and the pipe 26 are in communication.

For this embodiment substantially the same components exist as for the previous embodiment. It is therefore unnecessary to describe these parts again. The most remarkable modifications are with regard to the enclosure 46 and the cavity 32.

Figure 8:
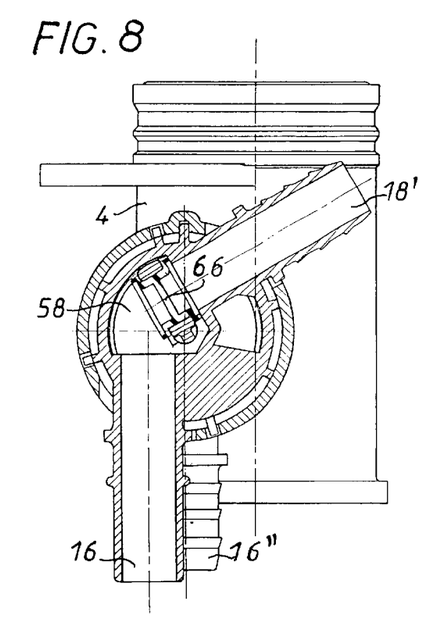
FIG. 8 is a view in section along the cutting line VIII—VIII in FIG. 7.

FIG. 8 is a view in section passing through the couplings 18' and 26' and shows the membrane 42 in abutment on the coupling 18'. It is very clear in this section how the arm 56 is off centre with respect to the axis of rotation of the rotor and how the membrane 42, notably its protrusions 64 and its partition 66, are in a radial position with respect to the pivoting movement of the rotor 40. This view in section is little different from that which would be obtained by cutting through FIG. 4 at the couplings 16' and 26'.

Figure 9:
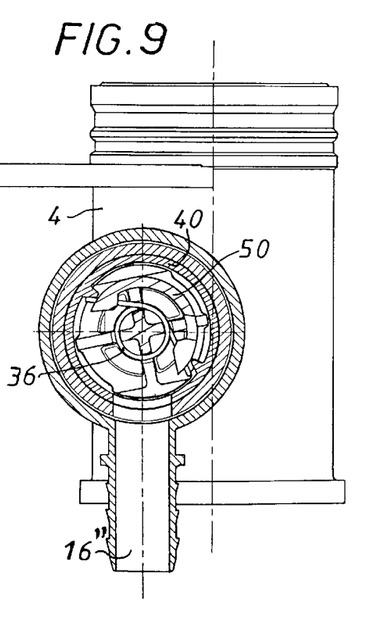
FIG. 9 is a view in section along the cutting line IX—IX in FIG. 7.

FIG. 9 for its part shows the attachment of the spring 36 to the rotor 40 and to the flange 50 of the spindle 34. This mounting corresponds to what is shown schematically in FIGS. 6A and 6D.

Figure 10:
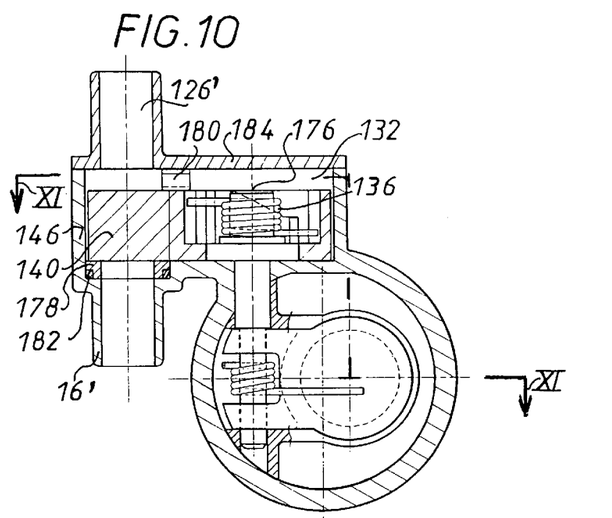
FIG. 10 is a view corresponding to FIGS. 4 and 5 for a third embodiment of a device according to the invention, according the cutting line X—X in FIG. 11.
Figure 11:
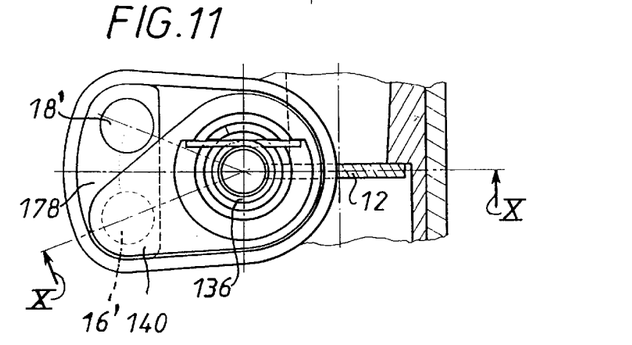
FIG. 11 is a view in section, along the cutting line XI—XI in FIG. 10.

FIGS. 10 and 11 show a third embodiment of a device according to the invention.

These two figures also depict a valve 20 like the one depicted in FIGS. 1 and 2. Here the closure of the pipes 16 and 18 is effected in a different manner. There is a valve with a rotary slide but this functions here in a different manner.

There is here a flap able to pivot for example through 65° to 75° and a valve having a rotor 140 pivoting through 60° for example. The same principle of elastic driving by means of a spring 136 between the spindle 34 of the flap 12 and the rotor 140 is found. The latter is here a selector able to move in rotation about a spindle 176 extending the spindle 34.

The couplings 16' and 18' are parallel to this spindle 176 and offset angularly by 60°. The seal between the rotor 140 and the couplings 16' and 18' is effected here by means of a fixed washer 178. An elastic device, for example a spring 180, provides an abutment force between the rotor 140 and the fixed washer 178. The sealing principle used here is similar to that used in ceramic taps. The rotor 140 has a form recalling a cam whose shape is designed so that the cam closes off a coupling 16' or 18', leaving the other coupling open, according to the position of the rotor 140.

In FIG. 10, it can be seen that a sealing joint 182 is provided to effect the seal between the washer 178 and the enclosure 146.

In this embodiment, there is a cavity 132 associated with the filler pipe 4 and in which there are housed the rotor 140 and the compensation system including notably a spring 136 making it possible to have a greater angular movement at the flap 12 than at the rotor 140. An expert will know without difficulty how to transpose the compensation system described here to this new embodiment.

Here the coupling 126' is produced on a cover 184 closing off the cavity 132. The coupling 126' is for example parallel to the coupling 16' and 18'. The cover 184 sealingly closes the cavity 132 and is fixed for example by ultrasonic welding. The spring 180 involved above advantageously bears on the cover 184.

This valve is of the single-way flap type and, according to the position of the flap 12, effects either the closure of the pipe 16 or the closure of the pipe 18. This makes it possible to vent the tank both during the refuelling phase and during the running and parking phases.

Figure 12:
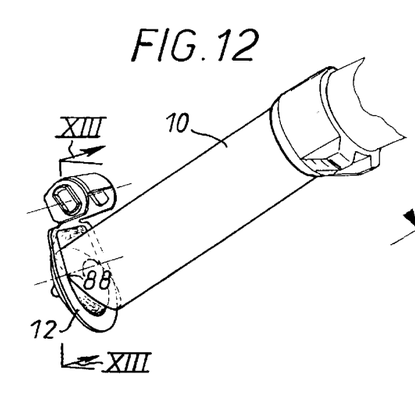
FIG. 12 is a view in perspective showing a flap and the end of a filling nozzle.

FIG. 12 depicts a particular embodiment of the flap 12. It will be noted that the force necessary for actuating the valve 20, in all the previous embodiments, is exerted by the nozzle 10 when it opens the flap 12. The embodiment of the flap shown in FIGS. 12 and 13 minimises the force to be supplied.

The flaps of the prior art are generally flat flaps. Thus, when the nozzle 10 comes into contact with the flap, this contact is effected very close to the pivot axis of the flap 12. Because of this, to actuate the flap and the valve which is coupled to it, the force to be supplied is relatively high even if the valve actuation torque is optimised. The flap 12 of the devices described previously therefore preferentially has the shape shown in more detail in FIGS. 12 and 13. Such a flap could be envisaged for any flap used in a filling orifice of a fuel tank in so far as it is wished to reduce the force necessary for opening this flap.

Figure 13:
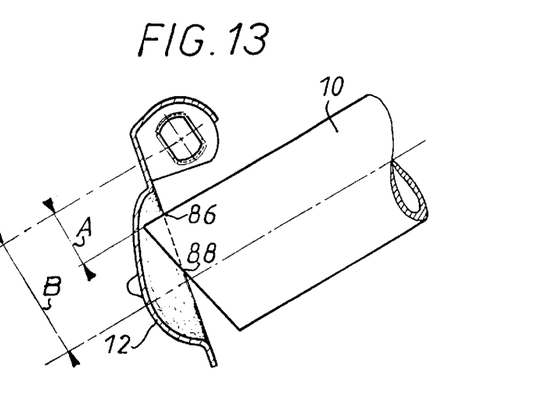
FIG. 13 is a view in section along the cutting line XIII—XIII in FIG. 12.

The flap 12 has, on the face intended to come into contact with the end of the nozzle, a hollow whose width measured in the direction of the pivot axis of the flap is very slightly less than the diameter of the end of the nozzle. Thus, when the nozzle is inserted in the filling orifice, it comes into contact with the valve at its diameter which is precisely parallel to the axis of articulation of the flap. Referring to FIG. 13, it will be noted that, in the case of a flat flap, the contact between the nozzle 10 and the flap would take place substantially at the point marked by the reference 86. The distance from this point to the articulation axis of the flap is called A.

In the case of the flap 12 described here, the contact between the nozzle 10 and the flap 12 takes place at two points bearing here the reference 88. It will be noted that the distance separating the points 88 from the articulation axis is the distance B. In the case of FIG. 13, B is substantially twice as great as A. Thus, for the same torque exerted on the flap 12 in order to effect its closure, the force to be supplied with the flap 12 as depicted here is approximately half that with a flat flap.

This embodiment is particularly advantageous in the case where a valve is driven by the pivoting of the spindle of the flap 12. This is because the actuation of the valve gives rise to an additional torque during the pivoting of a flap of the prior art for which only the torque of a closure spring is to be overcome. The increase in the lever arm makes it possible to substantially reduce the force to be exerted to open the flap.

Naturally the shape of the cavity produced in the flap 12 can be designed so that the distance between the articulation axis and the point of contact is different from B. Thus, by acting on the width and depth of the hollow, the distance between the contact point or points and the articulation axis of the flap varies. The depth of the concavity will always be chosen so as to be sufficient for the point of contact between the nozzle 10 and the flap 12 not be on the generator line of the nozzle closest to the articulation axis of the flap 12.

The present invention is not limited to the details of the embodiments considered above by way of non-limitative examples but on the contrary extends to any modifications within the capability of an expert within the scope of the following claims.

Thus, for example, the venting system is controlled directly by a mechanical in-line link from the pivot axis of the flap situated at the filling orifice. It can also be envisaged for example using a solenoid valve and using the movement of the flap spindle to control this. In the case of a mechanical system, other embodiments can be envisaged.

It would be quite possible to have a single-way, two-way or three-way valve different from that described above and depicted in the drawing. It can also be envisaged using a slide valve. The pivoting movement of the flap will then be converted into a translation of the valve slide.

All the systems described have a compensation system between the flap spindle and the valve rotor. This optional compensation system uses a spring but other elastic means, for example a block of rubber or synthetic material, could be used.

What is claimed is:

1. A venting device for a motor vehicle fuel tank having on the one hand a filler pipe provided with a flap mounted so as to be pivotable about a spindle, prestressed in a closed position and adapted to be opened by the end of a filling nozzle, and on the other hand first and second vent pipes for venting the tank, said venting device comprising means for closing off the vent pipes when said tank is being filled, said means being controlled by pivoting the flap about said spindle;

wherein said means include a valve;

each of said vent pipes is connected on the one hand to the tank and on the other hand to said valve controlled by the spindle of the flap situated in the filler pipe;

the valve has a first position corresponding to the closed position of the flap with the second vent pipe being closed off by the valve, and a second position corresponding to an open position of the flap with the first vent pipe being closed off by the valve;

the valve has a two-position rotor, two radial inlets disposed in the same plane with an angular offset corresponding to a magnitude of rotation of the rotor, and an outlet; and the rotor, in each of said first and second positions, blocks off one of said inlets, the other inlet then being in communication with the outlet.

2. The device according to claim 1, wherein the rotor has a longitudinal arm off-centre with respect to a rotation axis of the rotor and carrying a membrane substantially radial with respect to the movement of the rotor, said membrane blocking off one of said inlets in each of the first and second positions of the valve.

3. The device according to claim 1, wherein the rotor is in the form of a shaft with a cam which in the first position closes off one inlet and in the second position closes off the other inlet.

4. A venting device for a motor vehicle fuel tank having on the one hand a filler pipe provided with a flap mounted so as to be pivotable about a spindle, prestressed in a closed position and adapted to be opened by the end of a filling nozzle, and on the other hand a pipe for venting the tank, said venting device comprising means for closing off the pipe when said tank is being filled, said means being controlled by pivoting the flap about said spindle;

wherein the flap has a hollow on a face thereof, said hollow adapted to come into contact with the filling nozzle so that the contact between the nozzle and the flap takes place at a point distant from a pivot axis of the flap.

5. A fuel tank equipped with the device according to claim 4.

6. A fuel tank equipped with a venting device, said fuel tank having a filler pipe provided with a flap mounted so as to be pivotable about a spindle, said flap having a closed position, where said filler pipe is closed by said flap, and being adapted to be moved to an open position, where said filler pipe is open, by the end of a filling nozzle;

said venting device comprising first, second and third pipes for venting the tank and a valve controlled by pivoting the flap about said spindle, said valve connecting the first pipe and the third pipe and disconnecting the second pipe from the third pipe when said flap is in the open position, said valve connecting the second pipe and the third pipe and disconnecting the first pipe from the third pipe when said flap is in the closed position;

wherein, when said flap is in the closed position, said second pipe is communicated with said filler pipe via said valve.

7. The fuel tank of claim 6, further comprising a one-way valve forming a one-way vapor passage from the second pipe to the filler pipe.

8. The fuel tank of claim 7, wherein said one-way valve and said valve are housed in the same housing.

9. The fuel tank of claim 7, further comprising a rollover valve, other than said one-way valve, provided at an end of said second pipe.

10. The fuel tank of claim 6, wherein said second pipe is communicated with said filler pipe via a bore formed in said spindle.

11. The fuel tank of claim 6, wherein said first pipe is in permanent communication with said filler pipe regardless of the position of the flap.

12. The fuel tank of claim 11, wherein said first pipe is communicated with said filler pipe via a bore formed in said spindle.

13. A venting device for a motor vehicle fuel tank having on the one hand a filler pipe provided with a flap mounted so as to be pivotable about a spindle, prestressed in a closed position where said filler pipe is closed by said flap, and adapted to be moved to an open position by the end of a filling nozzle, and on the other hand at least one pipe for venting the tank;

said venting device comprising a valve for closing off the pipe when said tank is being filled, said valve being controlled by pivoting the flap about said spindle, said valve comprising a sleeve mounted to be pivotably about said spindle, a spring disposed within said sleeve and between said sleeve and said spindle, and a sealing element carried by said sleeve for closing said pipe when said tank is being filled with said flap being in the open position.

14. The device according to claim 13, wherein the magnitude of pivoting of the rotor is less than the magnitude of pivoting of the flap when said slap is moved from the closed position to the open position.

15. The device according to claim 13, further comprising a fuel vapor filtration device connected to said valve.

16. The device according to claim 13, wherein said pipe connects the tank to said valve; and said pipe also connects the tank to the filler pipe when said flap is in the closed position.

17. The device according to claim 15, wherein said at least one pipe includes first and second vent pipes each connected on the one hand to the tank and on the other hand to said valve;

said valve, in a first position corresponding to the closed position of the flap, connects the first vent pipe to said fuel vapor filtration device, the second vent pipe then being closed off by the valve; and said valve, in a second position corresponding to the open position of the flap, connects the second vent pipe to the fuel vapor filtration device, the first vent pipe then being closed off by the valve.

18. The device according to claim 16, wherein said pipe is connected to the filler pipe, when the flap is in the closed position, by means of a non-return valve preventing any passage from the filler pipe to said pipe.

19. The device according to claim 18, wherein said non-return valve is disposed within said sleeve.

20. The device according to claim 19, wherein said sealing element has a through hole that is closed when said flap is in the open position, said through hole defining a passage from said pipe to said filler pipe when said flap is in the closed position.

21. The device according to claim 20, wherein said passage is further defined by a bore formed in said spindle.

\* \* \* \* \*